United States Patent [19]

Stieff

[11] 4,074,415

[45] Feb. 21, 1978

[54] FIBER OPTIC SEAL ASSEMBLY

[76] Inventor: Lorin R. Stieff, P.O. Box 263, Kensington, Md. 20795

[21] Appl. No.: 768,435

[22] Filed: Feb. 14, 1977

[51] Int. Cl.² .................................... B25B 27/02
[52] U.S. Cl. .................... 29/520; 29/566.4; 350/96.20
[58] Field of Search .......... 29/525, 427, 520, 566.1, 29/566.3, 566.4–566.6, 268, 267; 81/9.1 R; 350/96 B, 96 C; 140/93 A

[56] References Cited

U.S. PATENT DOCUMENTS

| 3,589,406 | 6/1971 | Moberg | 140/93 A |
| 3,946,467 | 3/1976 | Lukas et al. | 350/96 C X |
| 3,982,815 | 9/1976 | Nakayama | 350/96 C |
| 3,989,493 | 11/1976 | Barron et al. | 350/96 B X |
| 3,999,841 | 12/1976 | Dakss | 350/96 C |

Primary Examiner—Milton S. Mehr
Attorney, Agent, or Firm—James C. Wray

[57] ABSTRACT

A fiber optic seal assembly tool has a stripper for stripping a predetermined length of tubing from an end of a fiber optic bundle. The stripped end is inserted in a seal block and the block is gripped in a hand tool. An actuating lever is squeezed, biasing bundle clamps closed, and sliding a grooved anvil toward the block to press a collet chuck which holds the fiber ends into the block. When the collet is pressed into the block, ends of the fibers are sheared by a knife which moves in the anvil opening.

20 Claims, 4 Drawing Figures

FIBER OPTIC SEAL ASSEMBLY

BACKGROUND OF THE INVENTION

Officials responsible for the accountability and physical security of materials have recognized for a number of years the need to develop a secure, tamper-resistant indicating seal whose integrity and unique identity could be established in the field without removal or disassembly. A need has been also identified for a secure sealing system that could be continously and remotely monitored.

A new class of sealing devices, a fiber optic seal, has been described in which the typical sealing wire or tape was replaced with a glass fiber optic bundle. The seal was made by enclosing the two ends of the fiber bundle in a frangible, stressed glass clasp or by removing the protective plastic jacket from the bundle ends and holding the twisted glass fiber ends together with a metal collar. The optical integrity and continuity of the fiber optic loop could be checked after assembly by noting the transmission of light through the bundle. The unique identity or fingerprint of the seal could be established at the time the seal was assembled in the field by recording the random pattern of the ends of the glass fibers in the bundle. It was suggested that, if part of the bundle was illuminated, a random pattern of dark and illuminated fiber ends would be produced which could be photographed in the field using a portably hand-held photomicrographic instrument. A direct comparison of a negative taken at the time of the assembly of the seal with a positive print taken at a later date would provide the highest level of confidence if it must be established that a seal left unattended and unexamined for a significant interval of time has not been compromised.

In principle, the high degree of security which is offered by fiber optic sealing devices depends upon several features:

A unique fingerprint is generated by the completely random pattern of the ends of the optical fibers. The uniqueness of this fingerprint is further enhanced by the imperfections in shape and optical characteristics of the individual fibers in the bundle.

It is necessary to destroy the fingerprint during any disassembly of the seal.

A formidable problem is encountered in any effort to duplicate this unique fingerprint should the original seal be replaced with a substitute.

An equally formidable problem exists in re-establishing not only the light ransmitting capabilities of the individual fibers interrupted in the process of cutting the fiber bundle, but also the wide range of light intensities transmitted by the different fibers in the bundle.

The seals enable verification of the optical integrity of the fiber bundle as the whole as well as the integrity of each individual fiber in the bundle.

The assembly tool of the present invention is useful with fiber optic seals described in co-pending application Ser. No. 733,177 filed Oct. 18, 1976.

SUMMARY OF THE INVENTION

The new fiber optic sealing system of the present invention differs from the earlier fiber optic seals. The seal employs either commercially available or specially prepared glass or plastic optical fiber bundles, and a metal or plastic fiber locking assembly block. This hexagonally shaped block holds the fiber bundle securely in place against accidental disassembly and includes internal components which insure the complete mutual interpenetration of the fibers at the end of the bundle.

To assemble this type of fiber optic seal in the field, an appropriate length of the fiber bundle is cut and a tapered collar is placed on one end of the fiber bundle. Using the special cutter incorporated in the assmebly tool, approximately one and a quarter inches of the protective plastic jacket is removed from the end of the bundle. The stripped end of the fiber bundle is then fully inserted into one of the two cylindrical holes in the bottom edge of the hexagonal fiber locking assembly block and is secured by seating the tapered collar with the special seal assembly tool.

The remaining free end of the fiber bundle is passed through the special openings in the item to be sealed, and a second tapered collar is placed over the jacketed end of the bundle. Approximately one and a quarter inches of the protective jacket is removed, and the free end of the fiber bundle is similarly inserted in the second cylindrical hole in the assembly block and secured.

An object of the invention is the provision of a fiber optic seal assembly tool having a frame, an actuator connected to the frame, a slide mounted for sliding movement on the frame and connected to the actuator for moving the slide, a fiber optic seal block retainer means and an anvil means mounted on the frame and on the slide and connected to the actuating means for relatively moving the anvil with respect to the retainer and thereby pressing a collet into a block mounted on the retainer.

Another object of the invention is the provision of a bundle clamp with at least one movable portion and wherein a slide includes a portion which coacts with the movable portion of the clamp to move the clamp in a clamping direction for operating the clamp and holding a fiber optic bundle as a slide and anvil are moved toward a block within the retainer.

Still another object of the invention is the provision of a ramp which slides into engagement with a movable portion of a fiber optic bundle clamp to move the movable portion into clamping position.

A yet further object of the invention is the provision of a fiber optic seal asembly tool with a handle having upward parallel channels mounted thereon, a lever connected to the handle, and a slide positioned within the channels and connected to the actuating lever for movement within the channels.

Another object of the invention is the provision of a fiber optic seal assembly tool with shearing mechanism for shearing ends of a fiber bundle in a predetermined plane.

A still further object of the invention is the provision of a fiber shearing mechanism which is connected to a face of an anvil assembly.

A further object of the invention is the provision of a face of an anvil which is bifurcated for engaging sides of a collet and shearing mechanism which is centrally mounted between the bifurcations, with the shearing apparatus and the face of the anvil are co-planar and the fiber optic ends may be sheared with the anvil held against the collet after the collet is secured in the block.

Yet another object of the invention is an apparatus having a handle which includes a fiber optic bundle receiving guide and a stop for receiving a predetermined length of fiber optic bundle and which handle comprises a stripping mechanism associated with the bundle receiver, so that when a bundle is inserted within the receiver and the handle is closed, the stripping mechanism engages and cuts an outer layer of the bundle at a predtermined length.

Another object of the invention is the provision of an assembly of a fiber optic seal having stripping of a predetermined length of sheath from an end of a fiber optic bundle and exposing the fibers, inserting the stripped fibers in a seal block and inserting the block in a retainer, moving an anvil toward a collet in the block in which ends of the stripped fibers are held and securing the collet in the block.

Still another object of the invention is the provision of an assembly of a fiber optic seal where the moving of the anvil consists of moving a slide on which an anvil is mounted and which gripping comprises moving a bundle gripping apparatus into gripping position by the slide.

Yet another object of the invention is the provision of an assembly of a fiber optic seal where the moving of the slide moves a lever and thereby moves the slide toward the block.

Another object of the invention is the provision of an assembly of a fiber optic seal where the collet is held in the block with the anvil and the fiber ends are simultaneously sheared which are protruding from the block by moving a shear within separated portions of the anvil.

Another object of the invention is the provision of a stripping step comprising inserting a bundle in a receiver in a handle, stopping the insertion at a predetermined length by a stop within the handle, squeezing the handle and scoring the sheath by a knife mounted within the handle.

Another object of the invention is the provision of fiber optic seal assembly apparatus and method which presses collets into both ends of a block simultaneously sealing the sheathed end of fibers at the rear of the block adjacent the bundle clamp, using the bundle clamp as an anvil at the same time that the front anvil presses in the collet to lock the terminal of the fibers in the block.

BRIEF DESCRIPTION OF THE DRAWINGS

FIG. 3 is a detail of the shearing mechanism on the avil.

FIG. 4 is a detail of the stripping mechanism in the handle.

Figure 1:
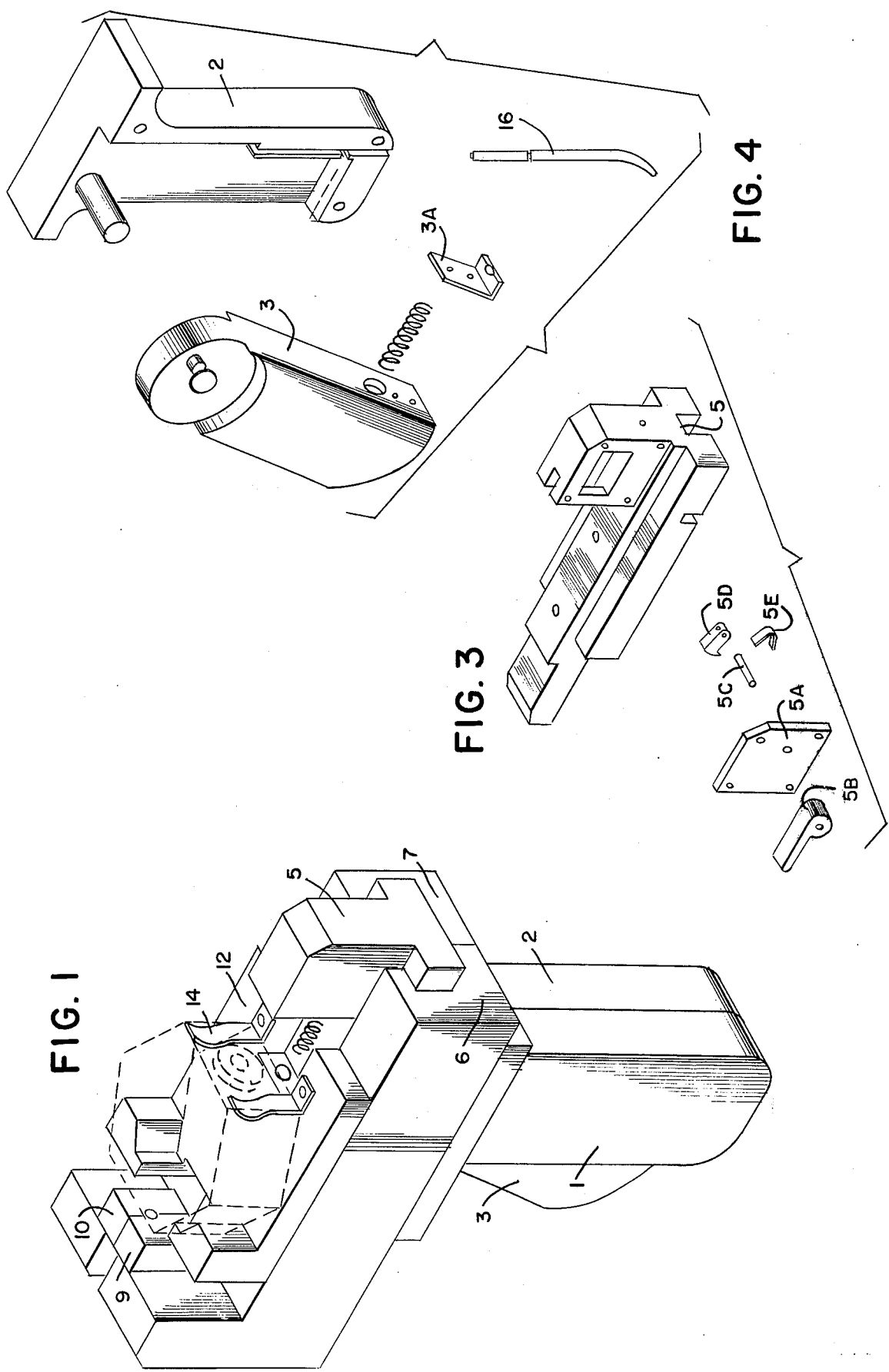
FIG. 1 is a perspective view of the assembly tool.
Figure 2:
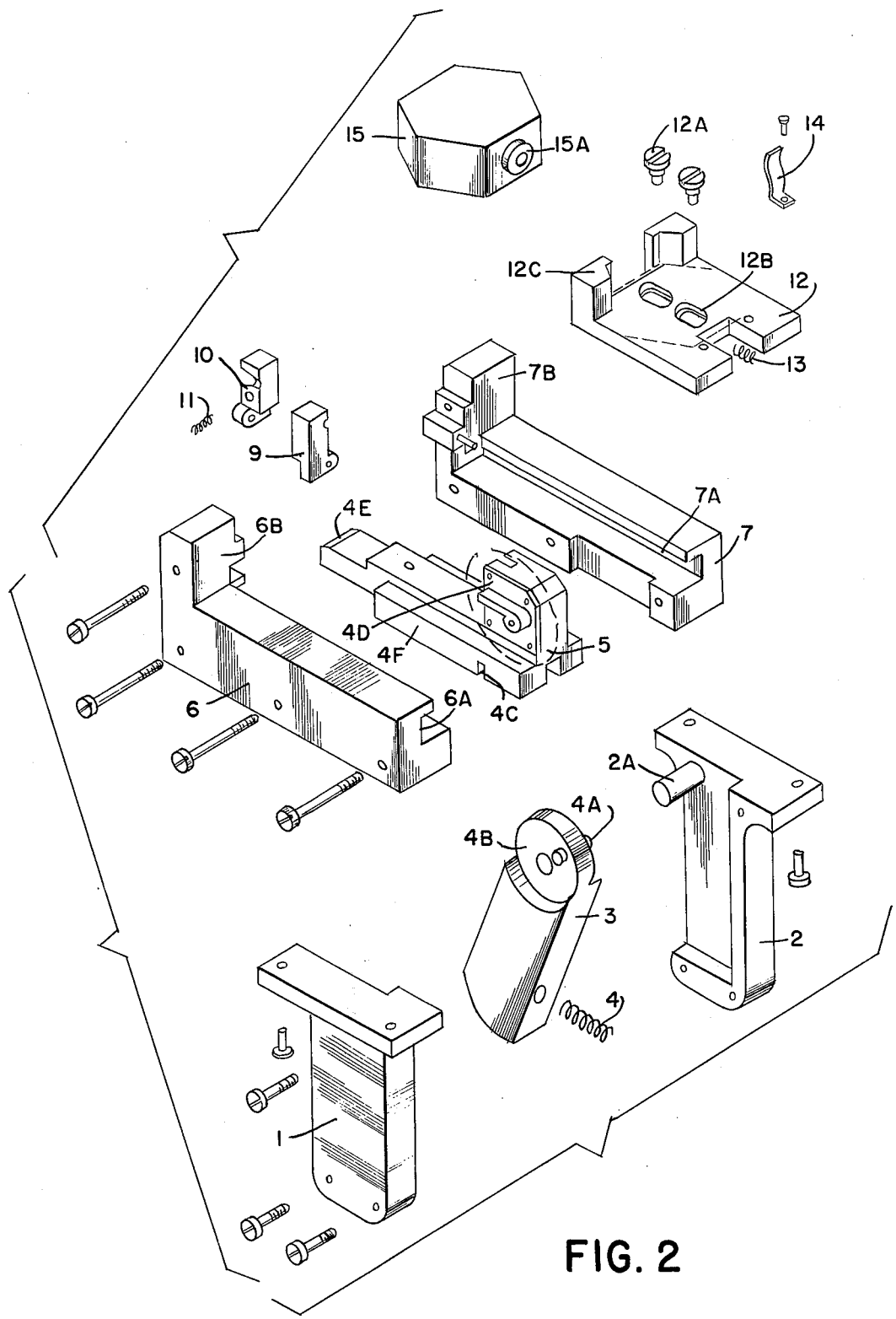
FIG. 2 is an exploded tool showing elements of the assembly tool.

Referring to the drawings, the left side of the handle grip frame is generally indicated by the numeral 1. The right side is indicated by the numeral 2. A shaft 2A mounts an actuating lever 3 which is urged forward by a spring 4. A pin 4A in an upper cylindrical portion 4B of the lever is mounted within a slot 4C in slide 5.

The slide which is known as a crimping ram includes a bifurcated anvil 4D and a foward projecting ramp 4E whose function later will be described. Lateral projections 4F fit within inward facing channels 6A and 7A of frame members 6 and 7.

Blocks 7B and 6B at distal ends of frame channel numbers 6 and 7 form a backing stop as later will be described.

A pin 8 is mounted on frame 7, and chuck members 9 and 10 are mounted on the pin and are urged outwardly into open position by spring 11. A retainer, such as a nut, is placed on the pin and outward rotating movement of the chuck members 9 and 10 is prevented by upper edges of the channel.

A block retainer 12 is connected to threaded holes in the top of slide 5 by screws 12A. As can be seen, collars on the upper ends of the screws allow the retainer to slide forward and rearward for a predetermined distance as controlled by openings 12B. Compression spring 13 urges the retainer 12 slightly away from anvil 4D. Abutments 12C are angularly recessed to hold a bundle end of the fiber optic seal block 15. Retainer springs 13 bolted to an opposite end of retainer 12 hold the block 15 against abutments 12C. Squeezing the lever 3 against handle 2 causes pin 4A operating in slot 4C to advance the slide 5 toward stops 6B and 7B. As slide 5 is advanced, ramp 4E lifts the bottom edges of clamp members 9 and 10 and rotates the members upward and inward around pin 8 to clamp the bundle extending from block 15 as the anvil pushes retainer 12 into its remote position with chocks 12C against stops 6B and 7B. Thereafter, the anvil 4D continues a slight forward motion so that the parallel vertical numbers of the anvil press collet 15A into block 15, securing the fiber ends.

Once the fiber ends have been so secured, with the handle 3 still squeezed, and the anvil 4D firmly against block 15, lever 5B is depressed as shown in FIG. 3. Lever 5B is mounted on a pin 5C within plate 5A which is secured to a side of the anvil by four small bolts. A shear blade 5D is mounted on the opposite end of the pin, and both the shear blade and lever 5B are secured to the pin for rotation therewith. Spring 5E lifts the shear blade up out of contact with the block until the shear blade is lowered with lever 5B. While lever 3 is squeezed with one hand, lever 5B is depressed with fingers of the other hand in the preferred method.

With reference to FIG. 4, a stripping mechanism is positioned within handle 2. The stripping mechanism includes a fixed length channel 2B with a stop at its upper end. Before the block is inserted in the retainer, a free end of the bundle is inserted in the channel 2B and handle 3 is squeezed, bringing stripping blade 3A into contact with the bundle 16.

In a preferred embodiment of the invention, block 15 is provided with one end of the bundle already inserted in the block. The other end of the bundle 16, as shown in FIG. 4, is provided with a sheath which is cut at a predetermined length but unstripped. The stripping mechanism in FIG. 4 is used to remove the precut remote portion of the sheath.

While the invention has been described with reference to specific embodiment, modifications and variations of the invention may be constructing without departing from the scope of the invention. The scope of the invention is defined in the following claims:

I claim:

1. A fiber optic seal assembly tool comprising a frame, actuating means connected to the frame, a slide mounted for sliding movement on the frame and connected to the actuating means for moving the slide, a fiber optic seal block retainer means and an anvil means mounted on the frame and on the slide and connected to the actuating means for relatively moving the anvil with respect to the retainer and thereby pressing a collett into a block mounted on the retainer.

2. The apparatus of claim 1 wherein the retainer is mounted on the frame, and wherein the anvil is mounted on a slide.

3. The apparatus of claim 2 further comprising a fiber optic bundle clamp mounted on the frame adjacent the retainer remote from the block for clamping a fiber optic bundle which is inserted into the block while the anvil is moved in a direction toward the block by the actuating means.

4. The apparatus of claim 3 wherein the bundle clamp comprises at least one movable portion and wherein the slide includes a portion which coacts with the movable portion of the clamp to move the clamp in a clamping direction for operating the clamp and holding a fiber optic bundle as a slide and anvil are moved toward a block within the retainer.

5. The apparatus of claim 4 wherein the slide comprises a ramp which slides into engagement with a movable portion of the clamp to move the movable portion into clamping position.

6. The apparatus of claim 5 wherein the clamp comprises two similar opposite portions which are moved into clamping position by the ramp on the slide.

7. The apparatus of claim 6 wherein the frame is a handle having upward parallel channels mounted thereon, and wherein the actuating means is a lever connected to the handle, and wherein the slide is positioned within the channel and is connected to the actuating lever for movement within the channels.

8. The apparatus of claim 1 further comprising a shearing mechanism connected to the apparatus for shearing ends of a fiber bundle in a predetermined plane.

9. The apparatus of claim 8 wherein the shearing mechanism is connected to a face of an anvil.

10. The apparatus of claim 9 wherein a face of an anvil is bifurcated for engaging sides of a collet and wherein the shearing mechanism is centrally mounted between the bifurcations and wherein the shearing apparatus and the face of the anvil are co-planar, whereby the fiber optic ends may be sheared with the anvil held against the collet after the collet is secured in the block.

11. The apparatus of claim 1 further comprising shearing means connected to the tool.

12. The apparatus of claim 7 wherein the handle includes a fiber optic bundle receiving guide and a stop for receiving a predetermined length of fiber optic bundle and wherein the handle comprises a stripping mechanism associated with the bundle receiver, whereby when a bundle is inserted within the receiver and the handle is closed, the stripping mechanism engages and cuts a outer layer of the bundle at a predetermined length.

13. A method for assembly of a fiber optic seal comprising stripping a predetermined length of sheath from and end of a fiber optic bundle and exposing the fibers, inserting the stripped fibers in a seal block and inserting the block in a retainer, moving an anvil toward a collet in the block in which ends of the stripped fibers are held and securing the collet in the block.

14. The method of claim 13 further comprising gripping a portion of the bundle which extends from the block.

15. The method of claim 14 wherein the gripping is simultaneous with the moving of the anvil toward the block.

16. The method of claim 15 wherein the moving of the anvil comprises moving a slide on which an anvil is mounted and wherein the gripping comprises moving a bundle gripping apparatus into gripping position by the slide.

17. The method of claim 16 wherein the moving the slide comprises moving a lever and thereby moving the slide toward the block.

18. The method of claim 17 further comprising holding the collet in the block with the anvil and simultaneously shearing fiber ends protruding from the block by moving a shear within separated portions of the anvil.

19. The method of claim 13 wherein the stripping step comprises inserting a bundle in a receiver in a handle, stopping the insertion at a predetermined length by a stop within the handle, squeezing the handle and scoring the sheath by a knife mounted within the handle.

20. The method of claim 13 further comprising concurrently pressing collets on opposite sides of a block, locking a bundle in a collet one side of the block, and concurrently locking fiber terminii in a collet on an opposite side of the block.

* * * * *